(12) United States Patent
Bucklitsch

(10) Patent No.: US 11,280,081 B2
(45) Date of Patent: Mar. 22, 2022

(54) EARTHQUAKE RESISTANT JOINT

(71) Applicant: Peter James Bucklitsch, Crowborouqh (GB)

(72) Inventor: Peter James Bucklitsch, Crowborouqh (GB)

( * ) Notice: Subject to any disclaimer, the term of this patent is extended or adjusted under 35 U.S.C. 154(b) by 178 days.

(21) Appl. No.: 16/708,466

(22) Filed: Dec. 10, 2019

(65) Prior Publication Data
US 2020/0248445 A1 Aug. 6, 2020

Related U.S. Application Data

(63) Continuation-in-part of application No. PCT/IB2018/054249, filed on Jun. 12, 2019.

(30) Foreign Application Priority Data

Jun. 12, 2017 (GB) .................................... 1709336

(51) Int. Cl.
*E04B 1/58* (2006.01)
*E04B 1/98* (2006.01)

(52) U.S. Cl.
CPC .................. *E04B 1/58* (2013.01); *E04B 1/98* (2013.01); *E04B 2001/5868* (2013.01); *E04B 2001/5887* (2013.01)

(58) Field of Classification Search
CPC ..... E04B 1/98; E04B 1/54; E04B 1/58; E04B 2001/5868; E05D 7/1044
See application file for complete search history.

(56) References Cited

U.S. PATENT DOCUMENTS

| | | | |
|---|---|---|---|
| 2,334,912 A | 11/1943 | Eide | |
| 3,465,895 A | 9/1969 | Miller | |
| 3,527,497 A | 9/1970 | Self | |
| 3,788,700 A | 1/1974 | Wartes | |
| 4,004,856 A | 1/1977 | Wesseler | |
| 4,068,332 A | 1/1978 | Ball et al. | |
| 4,154,419 A | 5/1979 | Breidenbach | |
| 4,312,454 A | 1/1982 | Steffen | |
| 4,409,765 A * | 10/1983 | Pall ....................... | E04B 1/2403 52/167.1 |
| 4,558,968 A * | 12/1985 | Meickl ..................... | E04B 1/58 403/174 |
| 4,592,286 A | 6/1986 | Trubiano | |
| 4,673,308 A * | 6/1987 | Reilly ....................... | A47F 5/14 403/172 |

(Continued)

FOREIGN PATENT DOCUMENTS

| DE | 1904738 A1 | 8/1970 |
|---|---|---|
| DE | 10061122 A1 | 6/2002 |

(Continued)

*Primary Examiner* — Paola Agudelo
(74) *Attorney, Agent, or Firm* — Berenato & White, LLC

(57) ABSTRACT

A joint comprising: a tenon, a mortise for receiving the tenon, an aperture formed in one of the tenon and an interior wall of the mortise and a pin which extends from the other of the tenon and the interior wall of the mortise; wherein the aperture is a hole which is engaged by the pin in use such that the tenon is supported within the aperture, and the tenon is capable of vertical and horizontal motion within the mortise in a plane substantially orthogonal to a longitudinal axis of the pin, the motion being limited by the edges of the aperture.

20 Claims, 13 Drawing Sheets

(56) References Cited

U.S. PATENT DOCUMENTS

| | | | |
|---|---|---|---|
| 4,729,484 A | 3/1988 | McConnell | |
| 4,926,759 A | 5/1990 | Vitsky et al. | |
| 4,930,753 A | 6/1990 | Alvyn | |
| 4,966,309 A | 10/1990 | Baer | |
| 5,012,555 A | 5/1991 | Byers | |
| 5,052,580 A | 10/1991 | Khoury | |
| 5,062,733 A | 11/1991 | Cholid et al. | |
| 5,127,760 A * | 7/1992 | Brady | E04B 2/825 403/230 |
| 5,211,502 A | 5/1993 | Upham-Hill | |
| 5,275,467 A | 1/1994 | Kawecki | |
| 5,351,453 A | 10/1994 | Leslie | |
| 5,617,694 A * | 4/1997 | Baba | E04B 1/2604 403/12 |
| 5,832,670 A | 11/1998 | Bennett | |
| 6,028,846 A | 2/2000 | Cain et al. | |
| 6,446,396 B1 | 9/2002 | Marangoni et al. | |
| 6,481,678 B1 | 11/2002 | Chong | |
| 6,669,396 B2 | 12/2003 | Mattle | |
| 6,707,631 B1 | 3/2004 | Haddock | |
| 6,843,025 B2 | 1/2005 | Paz | |
| 6,943,767 B2 | 9/2005 | Abe | |
| 7,017,312 B1 | 3/2006 | Mueller | |
| 7,134,728 B1 | 11/2006 | Buhrman | |
| 7,240,884 B2 | 7/2007 | Shim | |
| 7,300,110 B1 | 11/2007 | Debien | |
| 7,654,055 B2 | 2/2010 | Ricker | |
| 7,954,294 B2 | 6/2011 | Appleford | |
| 8,955,286 B2 | 2/2015 | Gadd et al. | |
| 9,010,068 B2 | 4/2015 | Sullivan et al. | |
| 9,382,703 B2 | 7/2016 | Quinn et al. | |
| 9,441,658 B2 * | 9/2016 | Hemphill | F16B 9/05 |
| 9,470,339 B2 | 10/2016 | Zhang et al. | |
| 9,556,605 B2 | 1/2017 | Elliott | |
| 9,593,505 B2 * | 3/2017 | Pryor | E04B 1/24 |
| 9,615,663 B2 | 4/2017 | Davis | |
| 9,828,794 B2 | 11/2017 | Romeu Guardia | |
| 9,879,413 B2 | 1/2018 | Castelli | |
| 10,130,893 B2 | 11/2018 | Heston | |
| 10,179,991 B2 | 1/2019 | Houghton | |
| 10,221,875 B2 | 3/2019 | Bonney | |
| 10,669,711 B2 | 6/2020 | Parshad | |
| D891,229 S | 7/2020 | Hohmann, Jr. et al. | |
| 2002/0193046 A1 | 12/2002 | Zebersky | |
| 2007/0130848 A1 | 6/2007 | Tsai | |
| 2008/0289268 A1 * | 11/2008 | Sarkisian | E04H 9/02 52/167.9 |
| 2010/0071296 A1 | 3/2010 | Johansson | |
| 2013/0028657 A1 * | 1/2013 | Kenho | E04B 1/2604 403/188 |
| 2013/0125497 A1 | 5/2013 | Kumakawa et al. | |
| 2014/0059956 A1 * | 3/2014 | Kerian | E04B 1/54 52/238.1 |
| 2015/0292537 A1 | 10/2015 | Frey | |
| 2017/0268224 A1 * | 9/2017 | Sato | F16F 15/04 |
| 2019/0257071 A1 * | 8/2019 | Green | E04B 1/2403 |
| 2021/0164223 A1 * | 6/2021 | Honarbakhsh | E04B 1/98 |

FOREIGN PATENT DOCUMENTS

| | | |
|---|---|---|
| EP | 1399629 A1 | 3/2004 |
| EP | 2432947 A1 | 3/2012 |
| FR | 1554634 A | 1/1969 |
| GB | 743259 A | 1/1956 |
| JP | 2014214542 A | 11/2014 |
| KR | 20170020642 A | 2/2017 |
| WO | 2006015762 A1 | 2/2006 |
| WO | WO2010134033 A1 | 11/2010 |

* cited by examiner

EARTHQUAKE RESISTANT JOINT

CROSS-REFERENCE TO RELATED APPLICATIONS AND CLAIM TO PRIORITY

This application is a continuation-in-part of International Application No. PCT/IB2018/054249, filed Jun. 12, 2018, which claims benefit to British Application No. 1709336.0 filed Jun. 12, 2017, the disclosures of which are incorporated herein by reference and to which priority is claimed.

FIELD OF THE INVENTION

The present invention relates to a construction jointing device, in particular for forming joints between elongate members; more particularly but not exclusively structural joints between elongate members such as beams and pillars in buildings in areas prone to seismic activity.

BACKGROUND

Increasing seismic activity in many locations across the world is combined with increased human activity in those locations. Construction can be problematic and/or expensive in locations with seismic activity.

Earthquake stresses usually come in two waves. First the P wave which compresses and then expands the horizontal dimensions of the building in the direction of the wave, followed by the S wave which creates vertical movements up and then down. To absorb the earthquake stresses the joints of a timber framed building must absorb stresses of horizontal compression and expansion followed by stresses of vertical movements up and down. Rigid joint methods are the most vulnerable to collapse.

Standard building techniques require the mortise and tenon joints of a timber framed building to be rigid and inflexible, with horizontal beams tightly jointed into a vertical pillar at an angle of 90 degrees. This rigidity can cause the standard mortise and tenon joints and their connected joints to fail when subjected to the stresses of an earthquake where the movements exceed the ability of the flexibility of the connecting beams to absorb said stresses.

Alternatively or additionally when the beam is too rigid then the beam itself may fail or one or both joints at the end of the beam may fail resulting in the whole or partial collapse of the building, particularly if the failed joints and or beam are located at the corners of the building.

SUMMARY OF THE INVENTION

It would be therefore desirable to have a device or system that allows a timber framed building to absorb the shock waves of a seismic event (earthquake) without failing due to the stresses involved in earth movements and which allows the normal joint structure of said timber framed building to revert to the pre-event positions once the seismic event passes.

Furthermore, it would also be desirable to have a device or system that allows the movement of the earthquake to be absorbed by each joint independently without causing said joint to permanently fracture and/or fail and without connected joints also fracturing and/or failing.

Still further, it would be desirable to have a device or system which is simple and obvious in use and which can withstand the rigours of the normal building site.

Technical Problem

Currently there are a number of disclosures in the art for the protection of standard mortise and tenon joints which attempt to strengthen the joint, but these are mostly impracticable for inclusion into common building practices, and or require a level of sophistication in assembly normally absent from a typical construction site.

Some devices attempt to strengthen the joint by use of struts, springs, weights and balances, but where these devices make the joint more rigid or strengthen the joint, this only briefly alleviates the time and power needed to create joint failure. Other devices seek to make the joint more flexible, but only operate in one plane and fail to address the stresses caused by one joint rising higher than another adjoining and connected joint.

Therefore, there currently exists a need in the industry for such a device and associated system that allows the construction of earthquake resistant buildings without requiring the builders to learn and understand complex systems.

Solution to the Problem

According to the present invention there is provided a joint comprising: a tenon; a mortise for receiving the tenon; an aperture formed in one of: the tenon and an interior wall of the mortise; a pin which extends from the other of the tenon and the interior wall of the mortise; wherein the aperture is engaged by the pin in use such that the tenon is supported within the mortise, and the tenon is capable of vertical and horizontal motion within the mortise in a plane substantially orthogonal to a longitudinal axis of the pin, the motion being limited by the edges of the aperture and a second lower pin or stabilisation pin which extends from the other of the tenon and the interior wall of the mortise wherein the notch in the tenon is engaged by the pin in use such that the tenon is supported within the mortise and said tenon is prevented from horizontal movement absent the energies released by a seismic event.

In some embodiments, the aperture is formed in the tenon, the pin extends from the interior wall of the mortise and the pin engages the apertures such that the tenon is supported on the pin. In other embodiments, the aperture is formed in the interior wall of the mortise, the pin extends from the tenon and the pin engages the apertures such that the pin is supported within the aperture and the tenon is supported within the mortise.

The joint may be used to connect a first body comprising the mortise to a second body comprising the tenon, such that the first and second bodies are displaceable with respect to each other. The magnitude, range, or direction of the displacement may be limited by the shape and/or size of the aperture, and/or by the shape or size of the mortise.

The depth and/or height of the mortise (which may be the vertical and horizontal dimensions of the mortise in the plane orthogonal to the longitudinal axis of the pin) may be greater than the length and height of the tenon (which may be the vertical and horizontal dimensions of the tenon in the plane orthogonal to the longitudinal axis of the pin), so as to allow the tenon to move within the mortise in the vertical and horizontal directions within the mortise. In some embodiments, the length of the tenon may be greater than the depth of the mortise, as the tenon may protrude from the mortise in all or some arrangements of the joint in use.

The width of the mortise may be substantially identical to or only slightly greater than the width of the tenon, this may prevent the tenon being displaced or twisted width-wise within the mortise. The width of the mortise and the tenon may be parallel to the longitudinal axis of the pin.

The aperture may be or may comprise indents, notches, recesses, or slots formed in the of the tenon (such as in a side face of the tenon) or in an interior wall (such as a side interior wall) of the mortise. Alternatively, or additionally, the aperture may be or may comprise a hole or passage through the tenon or through the body comprising the mortise, and/or a wall thereof.

In some embodiments, the aperture may be formed through the tenon or an interior wall of the mortise. In other embodiments the aperture may be depression such as an indent in the surface of the tenon or the interior wall of the mortise, in such embodiments the aperture will have single opening and a base.

The aperture preferably comprises at least one opening (which may be in the exterior surface of the tenon or in the interior wall of the mortise) which is enclosed by the surface in which it formed (i.e. the aperture is not a notch formed in an edge of the surface). In such embodiments the pin and/or other objects may only be displaceable into and out of the aperture in an at least partially depth-wise direction.

The pin may be a rod, tube, bolt, knob, nub, boss, or other protrusion which extends from an interior wall of the mortise, or from the tenon (such as from a side wall thereof). The pin may be formed on, be formed integrally with, or be rigidly or otherwise connected to the tenon or the interior wall of or body comprising the mortise.

In some embodiments, the pin may extend to a fixed distance away from the tenon or the interior wall of the mortise, may have a variable length such that it extends a variable length from the tenon or the interior wall of the mortise, or may extend from the tenon or interior wall of the mortise to some other structure (such as a pin head or a second tenon), or to another portion of the same structure (such as another interior wall of the mortise).

In some embodiments, the end or head of the pin may contact or abut the inside face of an indent, notch, recess, or slot defining or comprised by the aperture (such as an indent notch or slot formed in an interior wall of the mortise), alternatively, the pin may be dimensioned such that it does not contact the inside face of an indent, notch or slot comprised by the aperture (for example, the length of the pin may be less than the depth of the indent, notch, recess or slot), this may reduce friction between the pin and the aperture comprising element). In some embodiments, the pin may extend through the aperture, for example, the pin may extend through a hole or passage that defines or is comprised by the aperture.

In some embodiments, the pin may extend through the aperture to some other body or structure (such as a second tenon, a second interior wall of the mortise, or a plate which prevents the pin being displace out of the aperture), or to another element of the same structure (such as another interior wall of the mortise, which may be the opposite interior wall of the mortise). In some embodiments, the pin may extend through the aperture to a head which may be comprised by the pin, the head may be dimensioned such that it will not fit in or through the aperture or hole or passage thereof (for example, the head may have a width greater than that of the aperture or hole or passage). The head may be removable from the pin (for example, it may clip onto, or may be screw-able onto the pin).

The pin may be confined within the aperture, such that the pin is not removable from the aperture, and such that the tenon is not removable from the mortise. For example, in embodiments where the pin extends from the interior wall of mortise and the aperture is formed in the tenon, the pin may extend from a first interior wall of the mortise, through a hole or passage comprised by or defining the aperture, to a second interior wall of the mortise, which may be opposite the first interior wall of the aperture. In some embodiments, the mortise may be dimensioned such that the tenon may not be displaced sufficiently to disengage the pin from the aperture, for example the width of the mortise may not be sufficient for the tenon to be sufficiently displaced in the direction of the longitudinal axis of the pin in order to remove the pin from the aperture.

In some embodiments, the tenon may be removable from the mortise by disengaging the pin from the aperture. In some embodiments, the pin may be disengaged from the aperture by removing the pin from the aperture, for example by removing the pin from the joint, displacing the pin within the joint, or adjusting the length of the pin.

The pin (and/or longitudinal axis thereof) may be substantially normal to the surface from which it extends (for example, normal to the side face of the tenon or the interior wall of the mortise from which it extends). In embodiments where the pin extends from one interior wall of the mortise to another opposite interior wall of the mortise, the pin (and/or longitudinal axis thereof) may be normal to both of the interior walls of the mortise. In such embodiments the opposite interior walls of the mortise may be side walls.

The pin may be able to rotate with respect to the tenon and/or with respect to the mortise. In some embodiments, the pin may be able to rotate around its longitudinal axis. The pin may be able to rotate with respect the tenon or interior wall of the mortise from which it extends. For example, the pin may be free to rotate within a pin supporting aperture, or may be connected to the tenon or interior wall from which it extends by a rotating connection. Alternatively, or additionally the pin may have one or more wheels, or other rotating mechanical bearings thereon which may allow it move and/or rotate with respect to the aperture and/or the mortise.

The longitudinal axis of the pin may be a virtual axis between the furthest-most point of the pin from the surface or object from which it extends and the object from which it extends. The object from which the pin extends being the tenon or an interior wall of the mortise as described above.

The interior wall of the mortise from which pin extends or within which the aperture is formed may be a substantially vertical side wall of the mortise.

In some embodiments, the pin may be supported by a pin supporting aperture in the structure from which it extends (the mortise interior wall or the tenon). The pin may be a separate object, located partially within and extending out of the pin supporting aperture. The pin supporting aperture may have substantially the same cross section as the pin. In some embodiments, the pin may be able to rotate with respect to the pin supporting aperture the structure within which the pin supporting aperture is formed, and/or the mortise and tenon. For example, and the pin supporting aperture and the pin may be cylindrical.

In embodiments where the pin extends from an interior wall of the mortise, the mortise may comprise two pin supporting apertures in substantially opposite interior walls of the mortise, and the pin may be located within and extend between both pin supporting apertures.

The one or more pin supporting apertures may be or may comprise one or more holes or passages through the tenon (in embodiments where the pin extends from the tenon), or through the structure in which the mortise is formed (in embodiments where the pin extends from an interior wall of the mortise). The pin may be located in part of the length of the one or more holes or passages, may extend along the whole length of the one or more holes or passages, or may extend out of both sides of the one or more holes or passages. In some embodiments, the pins may comprise heads, flanges, rims, or other radial protrusions suitable for preventing them being displaced through and/or out of the holes or passageways defining or comprised by the pin supporting apertures.

In embodiments wherein the pin extends from the tenon and engages an aperture in an interior wall of the mortise, a secondary aperture may be formed in a secondary interior wall of the mortise (which may be opposite the aperture with which the pin engages). The pin may extend through a pin supporting aperture formed through the tenon and may engage both the aperture and the secondary aperture such that the tenon and the pin are supported by apertures and the mortise. Alternatively, or additionally, a secondary pin may extend from the tenon (and may extend from the opposite side of the tenon) and in use may engage with the secondary aperture, such that in use the tenon and the pins are supported by the aperture and the mortise. The secondary pin and/or the secondary aperture may be identically shaped and/or dimensioned to the pin and/or the aperture. All suitable variations to the pin and aperture described in this document may be made to the secondary pin and secondary aperture.

In embodiments where the pm extends from an interior wall of the mortise and engages an aperture in the tenon, in use the pin may contact the upper surface of the aperture formed in the tenon such that the tenon is supported on the pin, which in turn is supported by the mortise from whose wall it extends. In embodiments where the pin extends from the tenon and engages an aperture in an interior wall of the mortise, in use the pin may contact a lower surface of the aperture in the interior wall of the mortise, such that the pin is supported by the aperture and the interior wall of the mortise and may in turn support the tenon from which the pin extends. The lower and upper surfaces of the aperture in the tenon or the interior wall of the mortise may be defined by edges or side walls of the aperture which may contact and/or support the pin in use.

The tenon and the mortise may be a bridle joint mortise and tenon, or a slot mortise or tenon. The tenon may be smaller than the mortise and may be rounded. The mortise may be a slot mortise.

The pin may engage with the aperture such that the tenon is supported by the pin, and the tenon is capable of rotational motion within the mortise in the plane substantially orthogonal to the longitudinal axis of the pin.

In some embodiments, the tenon is displaceable between first, second and third arrangements in which the pin is located at first, second, and third locations respectively, the first, second and third locations being at the vertices of a triangle in a plane substantially orthogonal to the longitudinal axis of the pin.

The aperture may be triangular, or may be substantially V-shaped, arc-shaped, or chevron shaped. The aperture may have rounded corners, which may have radii substantially equal to the radius of the pin.

The longitudinal axis or the pin may be orthogonal to the side faces of the tenon and/or to the side interior walls of the mortise.

In some embodiments, in addition to the pin which extends from the tenon or from an interior wall of the mortise, the joint may comprise a stabilisation pin. The stabilisation pin preferably extends across the mortise, for example, between two interior walls of the mortise. For example, the stabilisation pin may extend between two opposite interior walls of the mortise such as side walls of the mortise. In use, the stabilisation pin may limit horizontal, vertical, and/or rotational movement of the tenon within the mortise.

The stabilisation pin may be for contacting an edge of the tenon when the tenon is in a resting arrangement (for example, an arrangement where the tenon is substantially horizontal and a pin extending from an exterior wall of the mortise is at an apex of the aperture in the tenon) and may prevent or limit displacement of the tenon out of the resting arrangement in a specific direction. For example, the stabilisation pin may contact a point on an edge of the tenon where it prevents or limits rotation of the tenon about the pin in one or more directions while the tenon is in the resting position.

In some embodiments, the tenon may comprise a notch or indent in an edge of the tenon which the stabilisation pin may contact, engage or fit into in the resting position so as to prevent or limit horizontal, vertical and/or rotational displacement of the tenon out of the resting position.

The mortise may be an indent formed in a larger object or may be defined by a plurality of panels or generally or substantially planar sheets. The mortise may be substantially or generally cuboid, and in some of its embodiments may be enclosed on five of its six sides. In some embodiments, the mortise may be a slot mortise, for example enclosed on three sides (such as its rear face and two side faces). In other embodiments, the mortise may be a through mortise, for example enclosed on its upper, lower and side faces.

The mortise may comprise two substantially parallel, and substantially planar surfaces, between which the tenon is located in use.

The tenon may be formed integrally with or be connected to a beam, joist, girder, or other substantially horizontal member. The mortise may be formed in, formed integrally with, or connected to another beam, joist, girder, or other substantially horizontal member. Alternatively, or additionally, the mortise may be formed in, formed integrally with, or connected to a column, pillar, upright, pile, post or other substantially vertical member. In other embodiments, the mortise may be formed in, formed integrally with, or connected to a wall. Structural elements such as beams, joists, girders, columns, pillars, uprights, plies, posts or walls, may comprise multiple mortises each connecting another structural member by a joint as described above.

A structure may comprise a substantially vertical structural member, at least one substantially horizontal structural member connected to the pillar by a joint according to the present invention. The vertical member may comprise the mortise of the joint, and the at least one substantially horizontal may comprise the tenon of the joint. The substantially vertical structure member may be a basal pillar element.

In some embodiments the structure may comprise a substantially vertical structural member comprising or connected to a plurality of mortises, at least one of which is connected to a tenon by a joint as described above. The tenon may be connected to or formed integrally with a substantially or generally horizontal member which may be displaced and/or rotated with respect to the substantially vertical structural member.

The construction jointing device preferably comprises at least two side members, elements or plates which may form or define the slot mortise of a joint comprised by the jointing device, wherein the joint connects the tenon of the joint to the substantially vertical member using said side members to locate the tenon. The tenon is able to rotate with respect to the side members which may be regarded as mortise panels which form the slot mortise element of the joint.

The disclosed invention advantageously provides a floating tenon in a variable mortise joint, which provides the ability for a timber framed building to absorb the shock waves of a seismic event (earthquake) without failing due to the stresses involved in earth movements and which allows the normal joint structure of said timber framed building to revert to the pre-event positions once the seismic event passes, that allows the movement of the earthquake to be absorbed by each joint independently without causing said joint to permanently fracture and/or fail and without connected joints also fracturing and/or failing and which is simple in the use of the device and can be used in the construction process without requiring undue training and monitoring and which can withstand the rigours of the normal building site.

The joint may be easily incorporated into the construction of a building and will provide resistance to the damaging forces of a seismic event (earthquake).

The generally or substantially horizontal members which comprise or are connected to the tenon may typically be substantially horizontal in use, but may be displaced from this horizontal arrangement by outside forces.

A construction jointing device may comprise a framework of interconnecting plates which may define one or more mortises (which may be slot mortises) which may receive a tenon so as to form a joint as described above.

The framework of interconnecting plates may comprise at least two substantially vertical parallel plates which may define a slot mortise of a joint as described above therebetween.

The framework of interconnecting plates may be secured or connected onto, or between one or more substantially vertical structural members such as posts, or columns. One or more tenons received by one or more of the mortises may be connected to or comprised by a generally horizontal structural member such as a beam, joist or floor support, so as to connect the generally horizontal structural member to the framework, or to a vertical structural member connected thereto. The generally horizontal structural members may be displaced to and from the horizontal arrangement in use.

In preferred embodiments the generally horizontal structural members will return to their original arrangements under their own weight in the absence of atypical external forces such as those resulting from an earthquake. The original positions being where the pin is at a resting position with the aperture, for example, where a pin extending from an interior wall of the mortise is at the apex of an aperture in the tenon, or a pin extending from a tenon is supported at the base of an aperture in an interior wall of the mortise.

The mortise or mortises comprised by a construction jointing device may further comprise a pin, about which and against which the tenon received by the mortises may rotate and/or be displaced. For example, the tenon may preferably comprise a substantially triangular aperture for passage of the pin, so as to define a joint between the tenon and the mortise, wherein the pin is rollable about the sides of the triangle shaped aperture during seismic movement.

The pin may be arranged to pass through the parallel plates which define the sides of the mortise so as to enable the construction jointing device to act as the intersection in use between vertical and horizontal structural members.

In some embodiments the parallel plates which define the sides of the mortise may comprise separate or separable parts. For example, in some embodiments the parallel plates may be partly or wholly displaceable from the framework of interconnected plates so as to better enable insertion of the pin(s).

The pin may comprise a pin, bolt, nut and bolt and/or a screw threaded portion.

The tenon is able to move vertically and or horizontally within the mortise and to then revert to an at rest position. The tenon may move within the confines of the mortise in horizontal and vertical directions while resisting the turning forces or moments along the central axis of a horizontal structural member to which it is connected.

In this way the construction jointing device may provide a floating tenon within a variable mortise joint which allows the joint to survive both the compressive P wave and the shear (or vertical) S wave of a seismic event. The structural member which is connected to the joint by the tenon may be connected to a second such joint at its opposite end.

In some embodiments the tenon is able to move horizontally and vertically within the mortise, being secured within the mortise by the pin which rotates freely in the plates which define the side of the mortise and which locates and limits the displacement of the tenon by passing through the aperture in said tenon.

In some embodiments, the tenon may be sandwiched in use between the parallel plates which define the sides of the mortise (the mortise panels).

The tenon preferably comprises a triangular aperture. The aperture preferably is formed with rounded corners.

In some embodiments the mortise defined by the construction jointing device is dimensioned to receive the entire end of a generally horizontal structural member (such as a beam) which may be the tenon of the joint and may have the aperture formed therethrough.

In some embodiments the device may comprise a spring panel fastener which fastener may allow the side members of the building construction to be firmly fixed while allowing movement around the fasteners about an arc of 360 degrees.

Advantageous Effects of Invention

The present invention provides a floating tenon construction system in a variable mortise joint which allows the joint to survive both the compressive P wave and the shear (or vertical) S wave of a seismic event and allows the normal joint structure of said timber framed building to revert to the pre-event positions once the seismic event passes, that allows the movement of the earthquake to be absorbed by each joint independently without causing said joint to permanently fracture and/or fail and without connected joints also fracturing and/or failing.

The disclosed device is particularly well suited for constructions with reference to seismic events, wherein during the P wave compression the tenon rides along the pin using the ramps provided by the sides of the triangular perforation, accommodating the compression and expansion of the P wave and then in the vertical movements of the S wave the pin rides up vertically pulling the tenon at the other joint at the end of the connecting beam up both vertically and horizontally, thus allowing the distance, or angle between two such joints at either end of structural member to vary as the structures to which the ends of a structural member are connected are displaced by the seismic event. For example, when a vertical structural member at one end of a horizontal structural member is displaced vertically or horizontally with respect to another vertical structural member at the opposite end of the horizontal member.

This enables the construction of buildings with a high degree of resistance to the stresses created by a seismic event such as an earthquake and protects the integrity of the building against joint failures.

The disclosed device may be used to connect to a number of different construction materials, such as timber, or metal girders, which may be scaled to suit the requirements of the building project.

The disclosed device may be retrofitted to existing buildings where appropriate original construction methods have been used, for example medieval timber frame constructions.

The disclosed device may be envisaged in a number of embodiments, for example comprising a single joint, corner embodiments with two joints, extension embodiments with two or three joints, and four way embodiments with four joints. In the system, these are linked using building materials such as timber, steel or concrete beams which are fastened to, or comprise the tenons.

The disclosed device provides an earthquake resistant building system which allows the construction of buildings that are more resilient to earthquake stresses than those using existing joint technologies yet is simple to use and understand. As a consequence the devices and system may be envisaged to be simple and cheap to produce, capable of use in both disaster relief operation, for example when operating a plywood option, and as a standard method of construction in earthquake risk zones in the steel construction.

The system allows movement in horizontal and vertical directions while resisting the turning forces or moments along the central axis of the horizontal structural members.

Advantageously the device and system of the disclosed device provides for the mortise and tenon joint to retain integrity while moving in horizontal and vertical planes, either separately or concurrently. The disclosed device allows for the horizontal structural member to increase in length (as measured along the member between objects to which it is connected at either end) when one joint rises higher in relation to an adjoining joint; and it allows the whole building to articulate one joint in relation to its connected joints throughout the building construction. The disclosed device further eliminates stress on adjoining structural fabric by alleviating the said effect; and is scalable to provide a solution for an earthquake-resistant building for differing construction requirements and differing construction materials.

Operation of the disclosed device is cost effective and provides a structural joint that is simple and cheap to install when building new constructions. The disclosed device reduces time on-site of expensive skilled labour which is normally required to construct the joints of a timber framed house.

Furthermore it may be envisaged that in use some embodiments of the device can be supplied either completely assembled or as kits where the disclosed device avoids the cost of transporting pre-fabricated factory units when attempting to reduce the cost of on-site labour and the disclosed device allows for both factory assembly and supply of finished units and also the supply of kits which allow for assembly on-site or close, which reduces the volume required to transport the joint solution considerably, and therefore the cost of the construction.

Furthermore, the disclosed device assists in the standardisation of designs in different embodiments and allows for low cost of production.

The system of construction using devices according to the present invention allows complex construction forms to be assembled easily and cheaply, with minimal training and pre-determined device configurations meaning that accuracy and integrity of construction is easily achieved.

In some embodiments, joints of structures comprising joints according to the invention may be connected using differing angles to form or follow variant building shapes. For example the corner extension connector could be varied so that the two external beam connector elements are at an angle of 135 degrees rather than the normal corner of 90 degrees.

In some embodiments, a construction jointing device may comprise a framework of interconnecting plates may be constructed as whole, maintaining structural integrity. The plates defining the sides of the mortise may be slotted into the framework in construction, with the connecting pin and tenon connected thereto in a final step.

In some embodiments, larger mortise side plates allow the tenon to move horizontally and vertically while resisting any rotation in the connected beam along the axis of the generally horizontal structural member.

The system of the current invention allows for the use of differing materials to suit the purchasing requirements in both developed and undeveloped economies.

The disclosed device and associated method will now be described more fully hereinafter with reference to the accompanying drawings, which are intended to be read in conjunction with both this summary, the detailed description and any preferred and/or particular embodiments specifically discussed or otherwise disclosed. This joint may, however, be embodied in many different forms and should not be construed as limited to the embodiments specifically set forth herein; rather, these embodiments are provided by way of illustration only and so that this disclosure will be thorough, complete and will fully convey the full scope of the invention to those skilled in the art. More specifically, any examples are illustrative and not intended to be limiting.

DETAILED DESCRIPTION OF FIGURES

Figure 1:
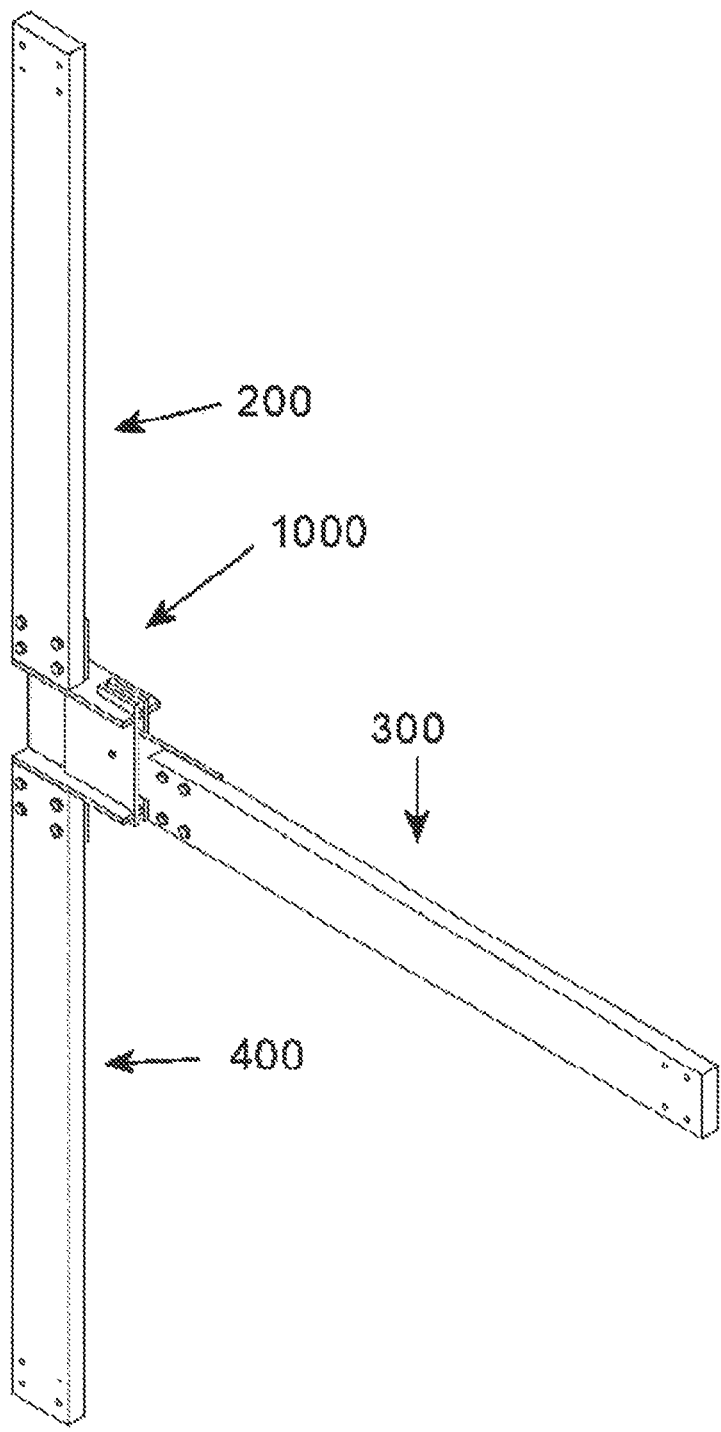
FIG. 1 shows an isometric view of a first embodiment of a device comprising a single joint according to the present invention connecting structural members.
Figure 5:
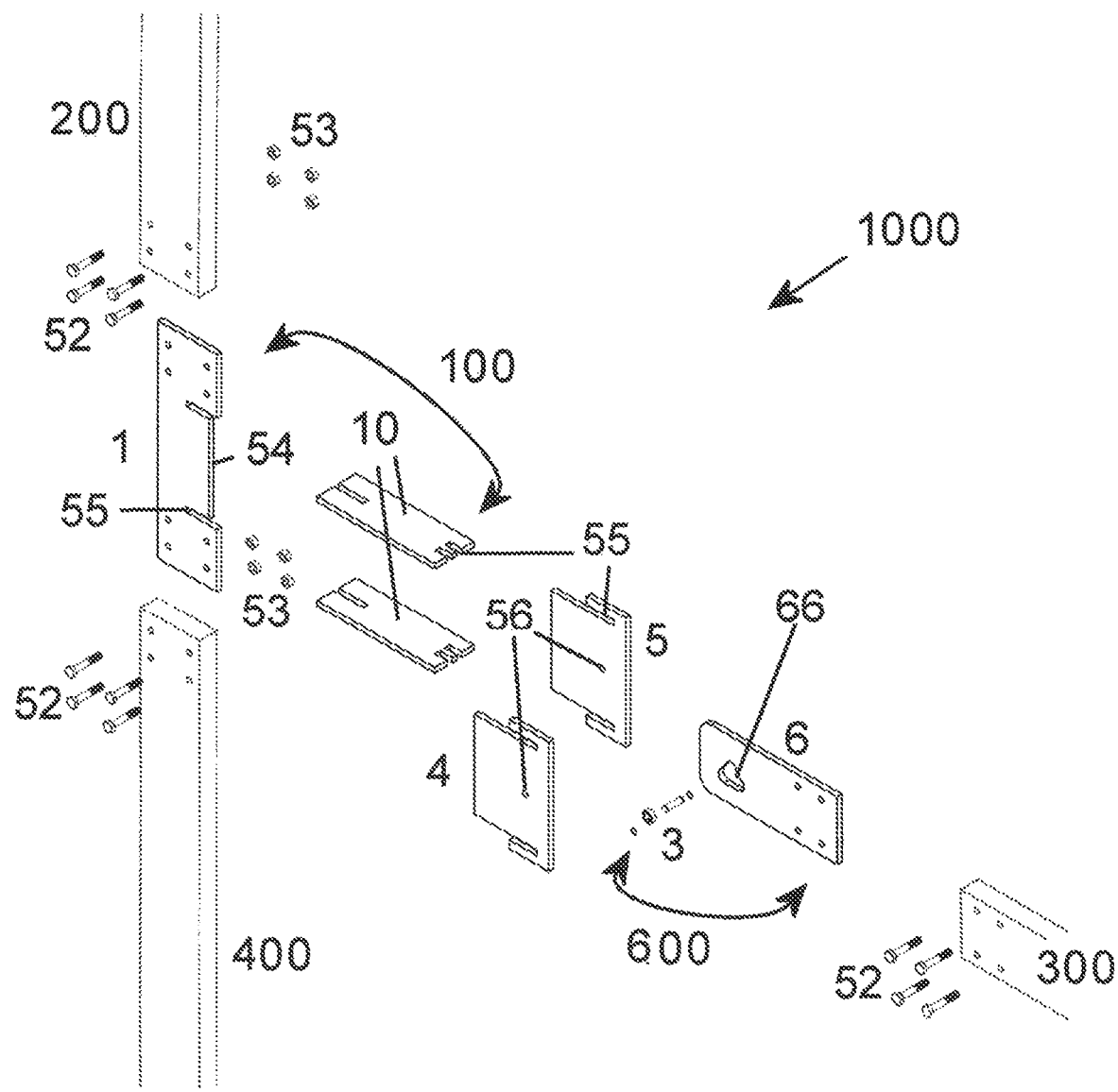
FIG. 5 shows an exploded isometric view of the device shown in FIG. 1.

With reference to FIG. 1 there is shown an embodiment of a beam and post connecting device 1000 comprising a mortise supporting framework 100 (as shown in FIG. 5); two mortise defining plates 4, 5; a tenon 6 and a pin 3. Wherein the tenon 6 is displaceable and rotatable about the pin 3.

With reference to the FIGS. 1 to 6, there are shown four configurations of beam and post connecting devices 1000, for connecting one, two, three or four beams 300 to posts 200, 400 at right angles to each other. These connecting devices 1000, beams 300, and posts 200, 400 may be assembled as required to form the skeleton of the building to which are attached the floors and ceilings of the interior FIGS. 1, 2, 3, 5, 7a, and 7b show mortise supporting frameworks 100 which comprise a slotted vertical plate 1, and identical slotted top plate and bottom plates 10, 11, 13 which are connected to the vertical plate 1 such that they are parallel to each other and envisaged to be substantially horizontal in use.

The slotted vertical plate 1 is substantially rectangular and comprises two horizontal slots 55 formed in one of the vertical edge intermediate the two ends of the vertical plate 1. The length of the edge 54 between the two slots 55 is indented so as to provide space for the mortise. The upper and lower ends of the vertical plate 1 each comprise a plurality of apertures for connection to vertical structural members or posts 200, 400 using nuts 53 and bolts 52.

Figure 2:
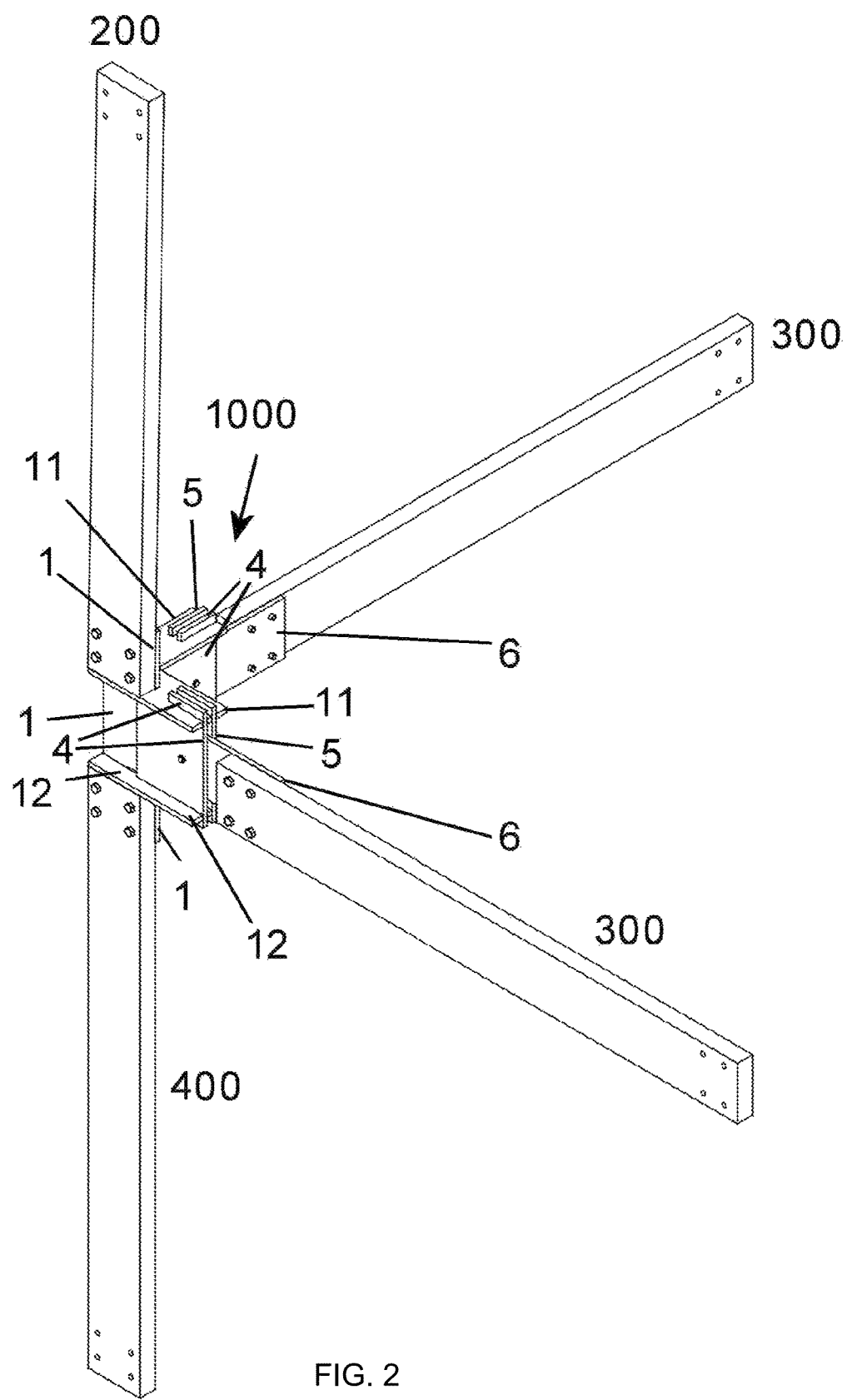
FIG. 2 shows an isometric view of a second embodiment of a device comprising two joints according to the present invention connecting structural members.
Figure 3:
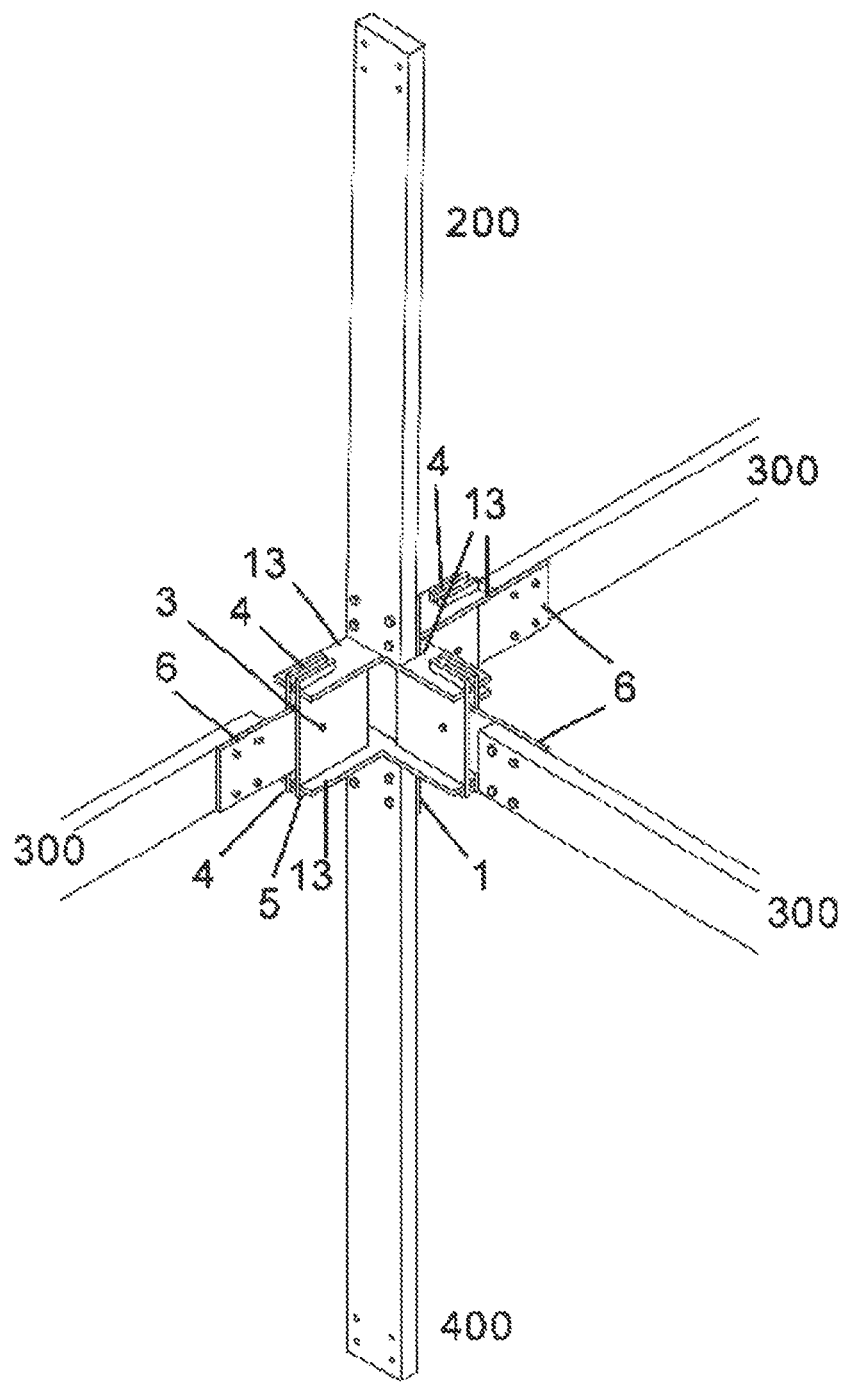
FIG. 3 shows an isometric view of a third embodiment of a device comprising three joints according to the present invention connecting structural members.
Figure 6:
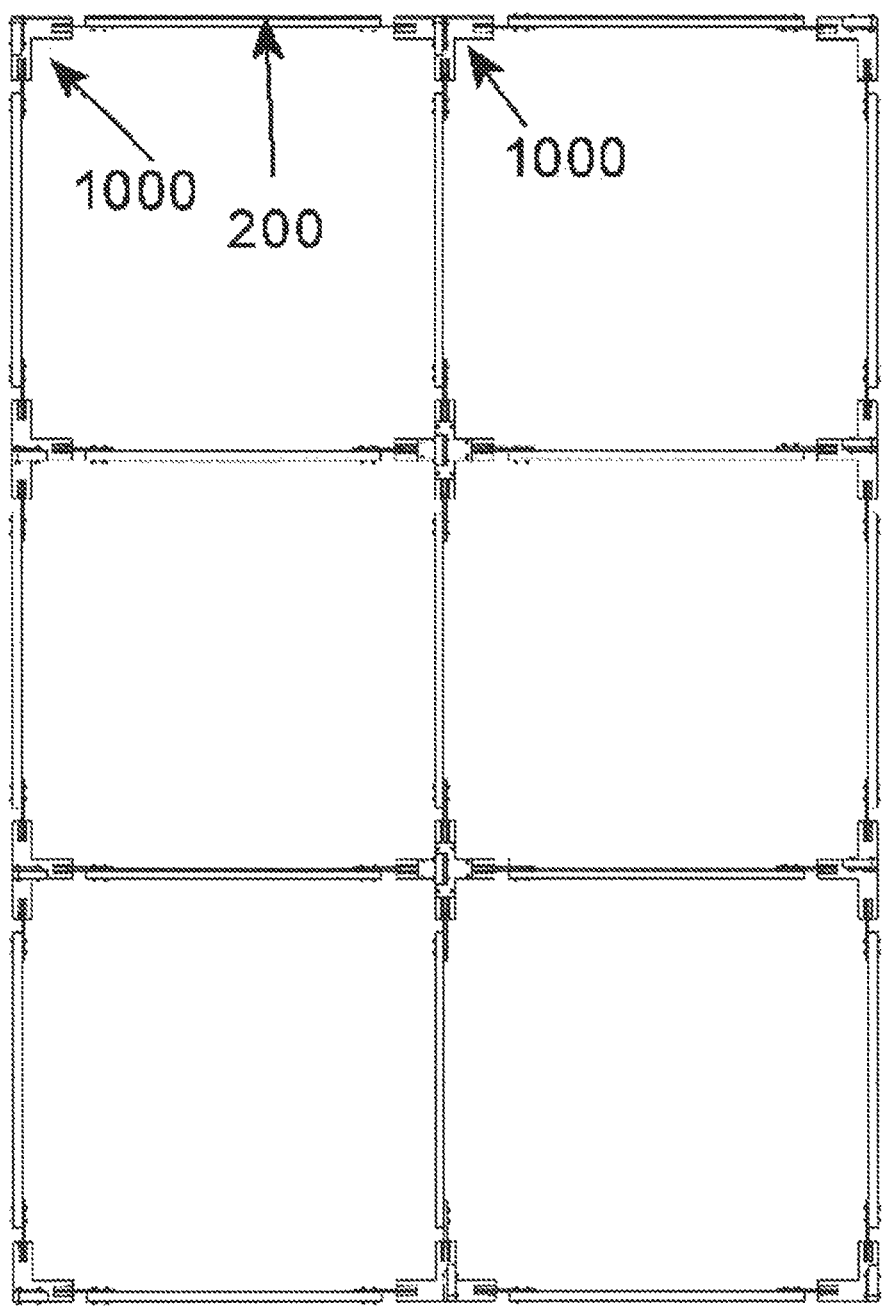
FIG. 6 shows a plan view of structure constructed from multiple devices as shown in FIGS. 1 to 4 and multiple structural members.
Figure 7A:
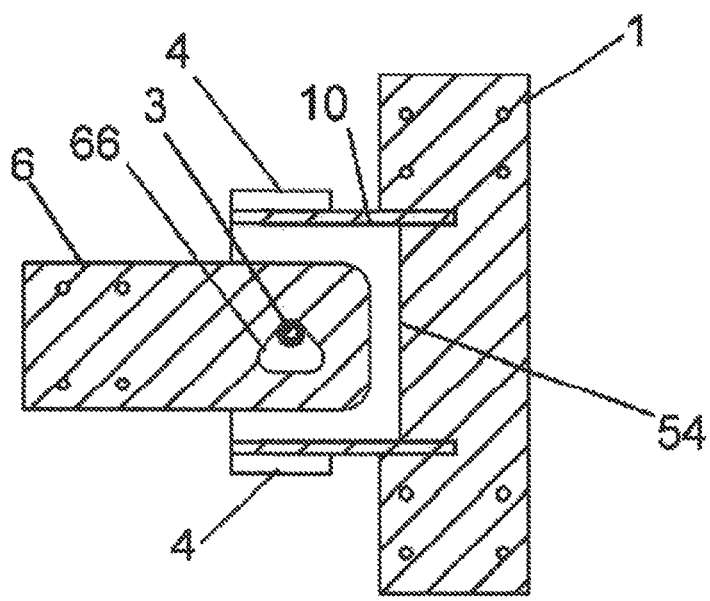
FIGS. 7a, and 7b show sectional views of mortise supporting frameworks in accord with the embodiment shown in FIGS. 1, 2, 3, and 5.
Figure 7B:
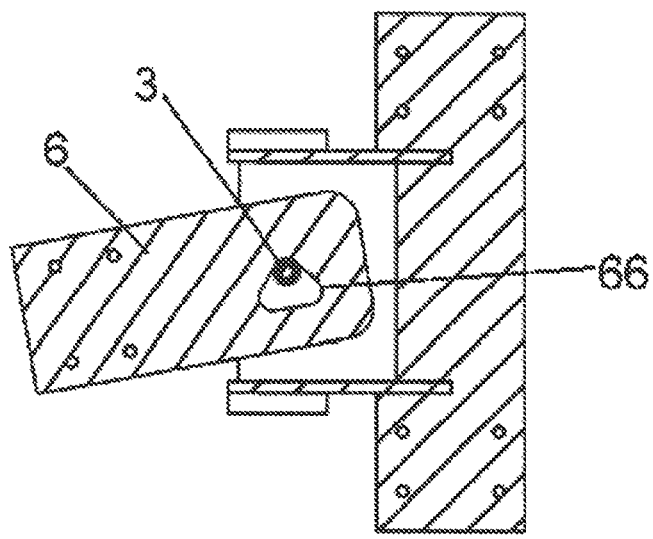

The slotted top and bottom plates 10, 11, 12, 13 each comprise one slot 55 for engaging with one of the slots 55 formed in the vertical plate 1, and at least one pair of parallel slots for engaging with slots 55 formed in mortise defining plates 4, 5, The top and bottom plates 10, shown in FIGS. 1, 5, and 6, comprise one pair of parallel slots; the top and bottom plates 11 shown in FIG. 2 comprise two pairs of parallel slots; and the top and bottom plates 13 shown in FIGS. 3, 7a, and 7b comprise three pairs of parallel slots. In these embodiments, each pair of slots is formed in a different edge of the top and bottom plates 10, 11, 13.

Figure 4:
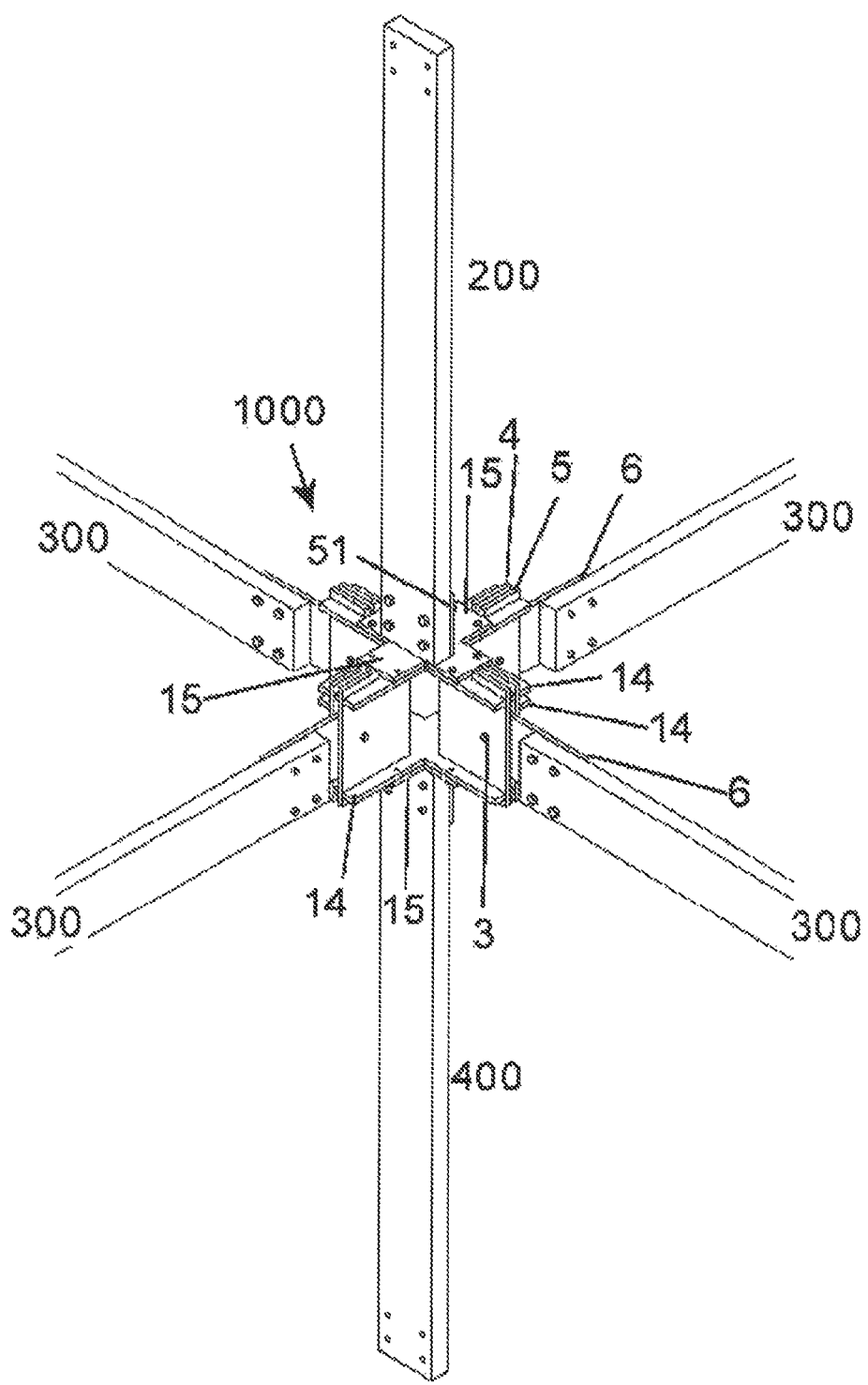
FIG. 4 shows an isometric view of a fourth embodiment of a device comprising four joints according to the present invention connecting structural members.

FIG. 4 showed mortise supporting frameworks which comprise upper and lower plate to beam connectors 15, 51, 34 instead of slotted vertical plates, and top and bottom plates 14, 33 which comprise no single slots for engagement therewith, only pairs of parallel slots for engagement with the mortise side defining plates 4, 5. The plate to beam connectors 15, 51, 34, each comprise a substantially horizontal plate 15 and a substantially vertical plate 51, which are formed integrally with, or rigidly connected to each other. The substantially horizontal portion connects to the top and bottom plates 14, 33 using nuts and bolts, and the substantially vertical plates connects to vertical structural members or posts 200, 400 using nuts and bolts.

The devices 1000 further comprise at least one pair of mortise defining plates 4, 5 which are arranged vertically in use and are slotted into the pairs of parallel slots 55 comprised by the top and bottom plates 10, 11, 13, 14 of the mortise supporting frameworks 100, A through mortise is thereby defined with upper and lower edges defined by the top and bottom plates 10, 11, 13, 14, and sides defined by the mortise defining plates 4, 5.

The top and bottom plates 10 shown in FIGS. 1 and 5 are rectangular and comprise one central slot 55 at one narrow end, for slotting into the vertical plate 1, and two parallel slots 55 at the other narrow end, for slotting into the mortise defining side plates 4, 5.

The gap 54 between the two slots 55 in the vertical plate 1 is indented in the illustrated embodiments in order to increase the depth of the opposite mortise but in some embodiments, there may be no indent.

The mortise supporting framework 100 is fitted between, and connected two substantially vertical structural members 200,400, in an appropriate manner compliant with the structural requirements of the building. For example, in embodiments wherein the structural members comprise timber and/or engineered timber products, the plate may be connected to the structural members by industrial strength glues and bolts; in embodiments wherein the structural members comprise steel and/or iron, the plate may be connected to the structural members by bolts and/or welding; and in embodiments wherein the structural members comprise for concrete and other similar types of construction material, the plate may be connected to the structural members by industrial strength glues and bolts. The method of attachment will be dependent on the stress loadings occasioned by the size and length of the structural members or beams 300 to which the tenons 6 comprised by the joints attach, and the load imposed on these structural members or beams 300, for example by flooring materials, ceiling materials, furniture, people and the material form which the beam is made. In FIGS. 1, 2, and 3 the vertical structural members are shown secured to the vertical plate 1 by four bolts 52 each. The same attachment methods may be used for upper and lower plate to beam connectors 15, 34, 51, as shown in FIGS. 4, 9, 10 and 12b.

The mortise defining side plates 4, 5 each comprise a single hole 56 adjacent the distal edge from the vertical structural members 200 400. This hole 56 allows passage of a pin 3, such as a support bolt.

In the illustrated embodiments, the tenon 6 is fitted to the end of the generally horizontal structural member or beam 300 in an appropriate manner compliant with the structural requirements of the building. For example, wherein the structural member or beam 300 comprises timber and engineered timber products the tenon 6 is connected to the structural member 300 by industrial strength glues and/or bolts 300; wherein the structural member or beam 300 comprises steel and/or iron, it may be connected bolts and/or welding; and wherein the structural member or beam 300 comprises concrete and/or other similar types of construction material, they may be connected by industrial strength glues and bolts. The method of attachment will be dependent on the stress loadings occasioned by the size and length of the structural member or beam 300 and the load imposed on the beam by flooring materials, ceiling materials, furniture, people and the material the beam is made from.

In FIGS. 1 to 4, the tenon 6 is bolted to the structural member or beam 300 using four bolts 52, where the structural member or beam 300 is bolted at one end of the tenon 6 and the other end of the tenon 6 is held between the side members 4,5 by the pin 3.

In some alternative (not illustrated) embodiments, the tenon may be formed integrally with the horizontal structural member or beam 300, for example wherein the aperture 66 is formed through the structural member or beam 300, and wherein the structural member or beam 300 may have rounded corners as the illustrated tenons 6 do.

The pin 3 is located such that it passes through pin supporting apertures 56 in the mortise defining plates 4,5 and the aperture 66 in the tenon 6. The pin 3 is able to rotate within the in supporting apertures 56 and the tenon 6 is able to be displaced and rotated with respect to the pin 3.

In some embodiments the pin 3 may comprise a solid bar or may comprise both a rod like portion and a plate like portion for confining the pin within the apertures 56, 66.

In other embodiments the pin 3 may be rigidly or permanently the mortise defining side plates 4,5. members permanently.

In the illustrated embodiment the pm comprises 19 mm phosphor bronze or stainless steel cylinders machined with two circumferential slots for accepting a circlip at either end. The circlip provides a flange which prevents the pin 3 from being displaced through and/or out of the apertures 56.

Alternatively, the pin 3 may be 19 mm phosphor bronze or stainless steel cylinder machined to have an enlarged head at one end and a circumferential slot at the other end. Alternatively, the pin could be secured by threading some or all of the outer parts of the pin and retaining the pin in place in the apertures 56 of the mortise defining side plates 4, 5 by use of nuts threaded onto the threaded portions.

In other alternative embodiments, the pin 3 may be formed integrally with mortise defining side plates 4, 5.

With reference to FIG. 2, there is shown a structural member interconnecting device 1000 comprising a mortise supporting framework 100, and two joints 600 each comprising a pin 3 and a tenon 6; wherein the tenon 6 is arranged to be displaced and rotated with respect to the pin 3.

The two joints 600, pins 3, and tenons 6 are each at right angles to each other.

With reference to FIG. 3, there is shown an embodiment of the structural member interconnecting framework device 1000 comprising three joints.

The device 1000 forms a T shape when viewed from above or below, with two opposing tenons 6, and a third orthogonal tenon 6 intermediate the other two.

With reference to FIG. 4 there is shown an embodiment of the structural member interconnecting device 1000 comprising four joints connecting to four horizontal structural members or beams 300 arranged to form a cross.

Other embodiments may be envisaged to cater for bespoke building requirements, for example with the top and bottom plates having mortises, tenons 6, pins, 3 and joints arranged with acute, obtuse, and/or reflex angles therebetween.

The mortise defining side plates 4, 5 are fitted into the top and bottom plates 10 of the framework 100. The mortise defining plates 4, 5 may be then secured permanently in place, for example wherein the plates comprise timber and/or engineered timber products, by industrial strength glues; and wherein the plates comprise steel and/or iron, by welding.

The apertures 66 formed through the tenons 6 of the devices illustrated in FIGS. 1 to 12 are substantially triangular machined apertures which allow the pins 3 to locate firmly at the top of the triangle when the structural members are in their normal resting positions, while allowing the stresses of an earthquake to enable the sides or faces of the triangular aperture 66 to slide along and around the pin for the duration of the earthquake while allowing the weight of the connected assembly of structural members (usually the floor or ceiling of the building) to settle the joint back into its original resting position. The sides of the triangular aperture 66 along which the pin 3 travels as the tenon 6 is displaced allow joints to transform from having right angles between the vertical structural members 200, 400 and the generally horizontal structural members or beams 300 to having acute or obtuse angles therebetween. Additionally, the distance between a mortise of a joint, and the opposite end of the structural member or beam 300 connected to the joint by a tenon 6 may be varied as the pin is displaced within the triangular aperture 66. This is illustrated in FIG. 15.

The top of the aperture 66 may be machined 2 mm deeper up into the tenon 6 to allow the pin 3 to fit with 50% of the pin diameter located within the top of the aperture 66. This preferably will augment the locking action of the pin in the connection plate in order to maintain the horizontal and vertical integrity of the construction elements of the building. When the frameworks are in their normal resting positions, the weight of the horizontal structural members or beams 300 will cause them to be displaced downwards until the pin 3 is located at the apex of the triangular aperture 66, where the more deeply machined point is located. If the frameworks 100 and mortises, are then displaced away from or towards the horizontal members or beams 300, the tenon may be displaced along the pin 3, such that the pin 3 leaves the apex of the aperture 66.

Minimal tolerance is provided by the gap between the slots 55, mortise defining panels 4, 5, in relation to the thickness of the tenon is a preferred part of the invention in that the floating tenon in the variable mortise resists the turning (moment) of the horizontal structural member(s) or connection beam(s) 300 around their longitudinal axis. This is important as the integrity of the building in a vertical plane requires that the lateral movement of the units be restricted to a minimum.

It is envisaged that the tenon 6 will move freely within the mortise plates 4, 5 and it also may be envisaged that it is assembled within the mortise plates optionally with a suitable lubricant in the form of a stable, long lasting grease. Lubrication of the tenon may be required prior to insertion into the framework or interconnecting plates.

Figure 8:
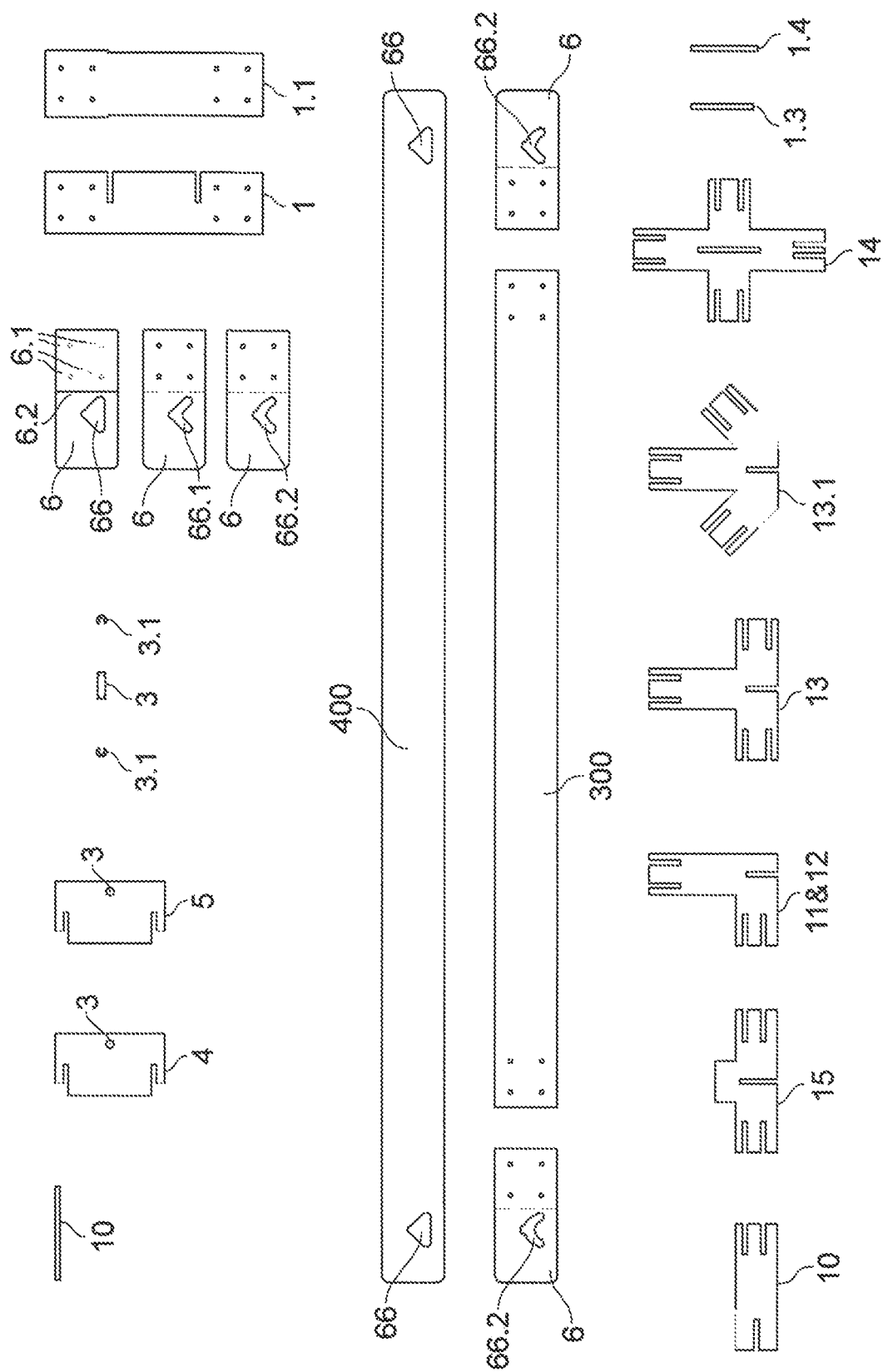
FIG. 8 shows component parts for constructing a device comprising one or more joints according to the present invention.
Figure 9:
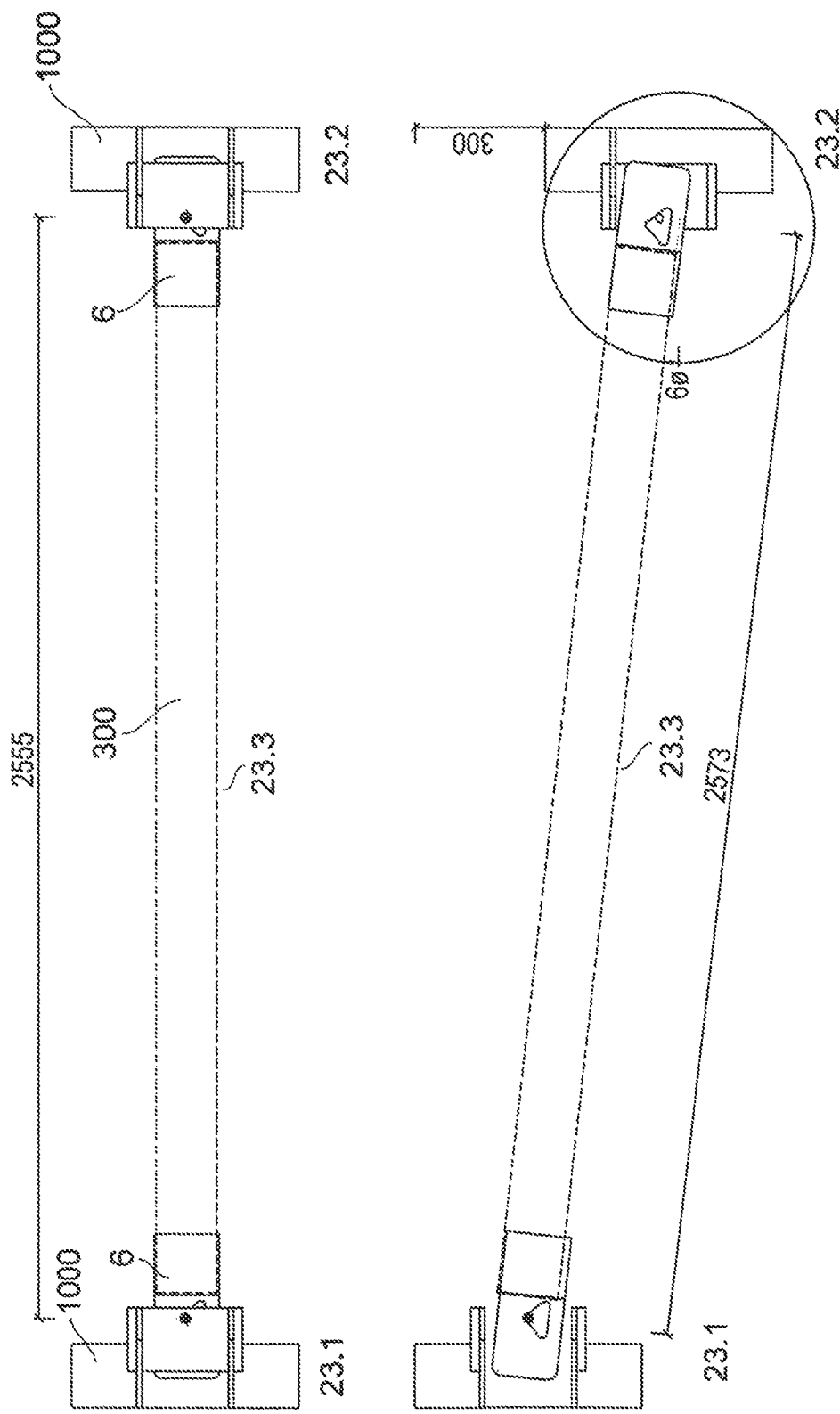
FIG. 9 shows a structural member with joints according the present invention at either end being displaced in use.
Figure 11:
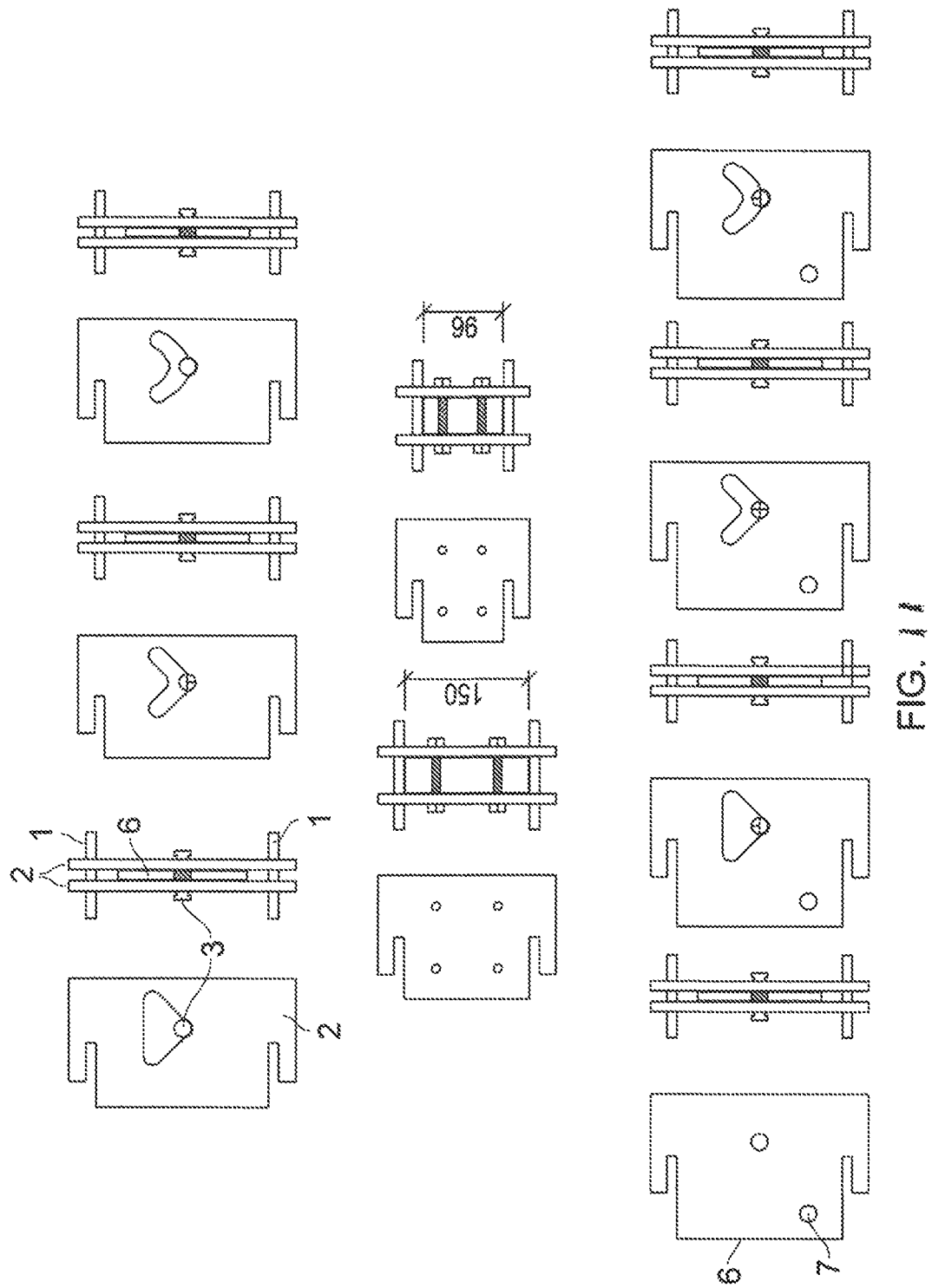
FIG. 11 shows various mortise defining side panels.

Referring to FIGS. 8 and 11 there are shown variations of the invention described above, including differently shaped top and bottom plates 10, 11, 12, 13, 13.1, 14 and 15. As well as variant tenons 6 with differently shaped apertures 66, 66.1, 66.2. FIG. 9 shows how the tenons 6 of a beam 300 are displaced and rotated with respect to the mortises of two joint comprising devices 1000.

Figure 13:
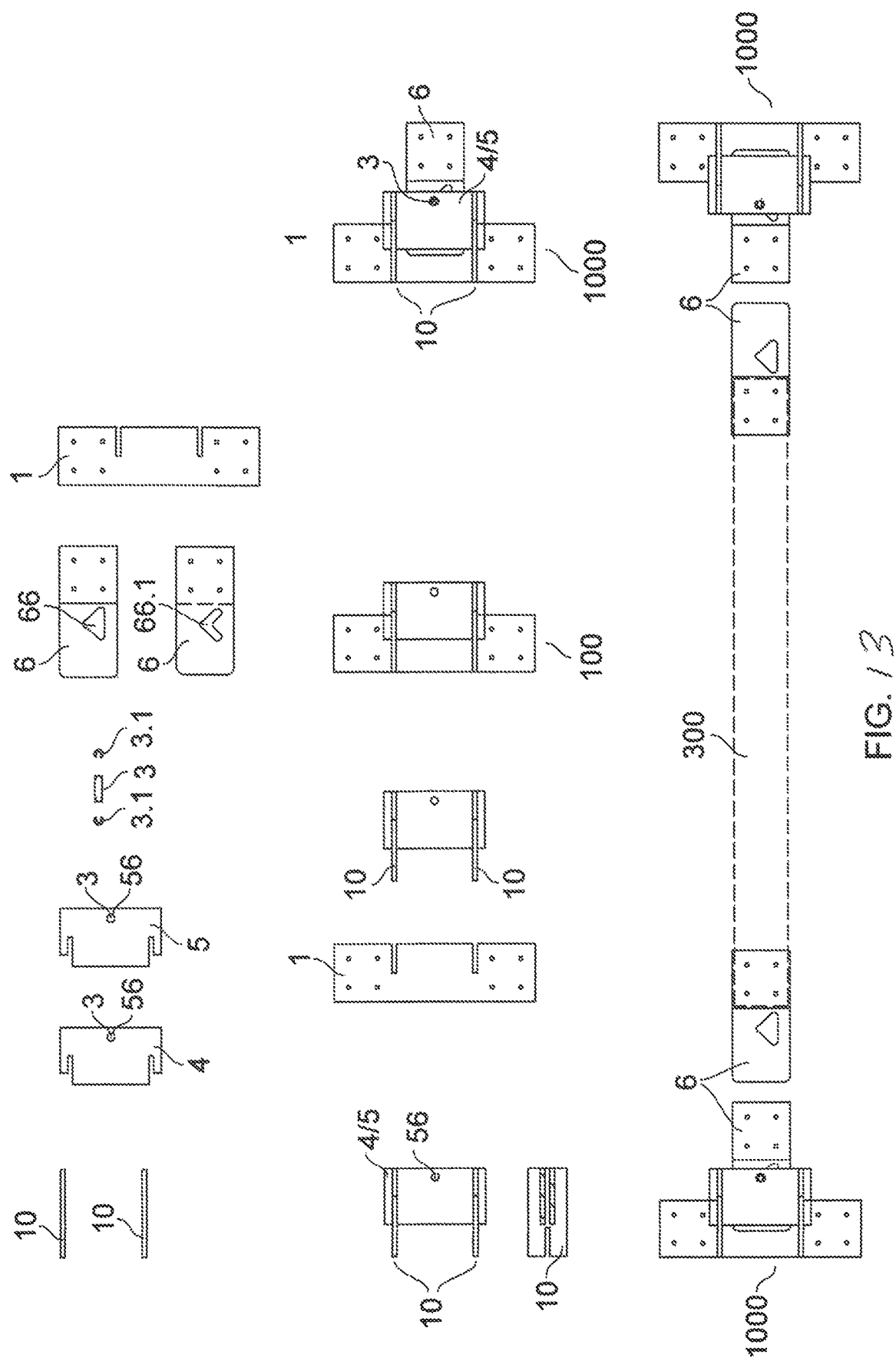
FIG. 13 shows the components of a joint being assembled in stages.

The present invention as pictured in FIGS. 1 to 13 thereby provides a floating tenon in a variable mortise which comprises the following components:

Two mortise defining side plates 4, 5 are drilled to accept the tenon supporting pin 3; one or more plates 1, 15, 51, 34 for connection to substantially vertical structural members 200,400, a tenon 6 machined to provide an open triangle aperture 66 for the pin 3 to pass through; whereby the tenon 6 is connected to (or formed integrally with, as shown in FIG. 13) a generally horizontal structural member or beam 300; and the pin 3 is connected to the mortise side defining plate 4, 5, and passes through the tenon 66 in order to allow rotation and displacement of the tenon 6 with respect to the mortise.

The device may be scaled to suit the requirements of the local area of construction where the risks of greater seismic movements may require longer travel along the ramps of the perforation sides to compensate for further elongation of the hypotenuse. This may require a larger aperture 66 in the tenon 6.

The embodiments of the device are assembled as required to interconnect structural members to form the skeleton of the building to which the floors and ceilings of the interior are attached. A possible layout of such a skeleton is shown in FIG. 8

Each joint comprising framework is connected to another joint comprising framework by structural members such as traditional construction beams of timber, steel, or concrete.

The sizing of the embodiments can be scaled to accommodate the requirements created by the specification of the connecting beam material and the dimensions and weight of the building.

The materials of the invention may need to be protected against corrosion such as caused by damp and or other corrosion inducing elements. This may ensure that the tolerances between the tenon and mortise plates and the pin and the mortise plates are maintained to allow these elements to move freely with respect to each other. To this end it is envisaged in the pictured embodiment that the device parts may be required to be coated in products suitable for the materials of the device. Further embodiments may be provided differently.

The invention can be constructed using a number of materials, for example: steel, concrete, and/or engineered timber products. The pins 3 may be manufactured from a variety of materials, for example: steel, phosphor bronze, oak or a similar hardwood, depending on the weight and configuration of the building The top and bottom plates of the basal parts may be constructed using a variety of materials, for example: steel; hardwood timber; glass fibre reinforced resin (GRP); carbon fibre reinforced resin, and/or engineered timber products such as plywood. The thickness of the material used would normally be fabricated for most instances from 12 mm steel plate or 12 mm plywood but this may be varied according to the requirements of the building designer taking into account the size, scale, and demands of the building.

It may be possible to construct the tenon 6 from the material used to fabricate the horizontal structural member or beam 300 to which it is connected, provided that accurate machining can be applied to the ends of the structural member or beam 300 and that the process does not weaken the overall strength of the structural member or beam 300.

FIG. 8 shows the components required to create various standard iterations of the embodiment. For any one embodiment of the present invention as described in FIG. 1 the mortise supporting framework 100 requires two top and bottom plates, at least two mortise defining side panels 4 and 5; one pin 3 (or some other embodiments of the pin).

FIG. 8 depicts components suitable for the construction of multiple different variants of joints according to the present invention. Three different tenons 6 are shown with three differently shaped apertures 66, 66.1, 66.2 formed therethrough. Aperture 66 is the triangular shaped aperture with the rebated top which reduces lateral sway; aperture 66.1 is an inverted V shape slot that controls the motion of the tenon, and aperture 66.2 is an arcuate inverted U shaped slot that is designed to dampen the movement of the tenon without creating an impediment to free movement.

FIG. 8 further shows multiple different top and bottom plates 10; 11; 12; 13 and 14 which comprise different numbers of pairs of slots for receipt of pairs of mortise defining side plates 4, 5, at different angles to each other.

Items 15 and 13.1 are other variations on the top and bottom panels that comprise the mortise supporting framework 100. Item 13.1 shows how bespoke building shapes can be accommodated.

Item 400 (distinct from item 400 shown in FIGS. 1 to 6) is a generally horizontal structural member, wherein the tenons are defined by the ends of the structural member, and the apertures 66 are formed through the structural member 400. This structural member may require an alternative version of the top and bottom plates 10; 11; 12; 13; 14; 15 and 13.1 with more widely spaced pairs of parallel slots as the mortise defining side panels 4,5 would need to be set wider apart.

FIG. 13 displays a typical methodology to construct a structure comprising a joint according to an embodiment of the invention resulting in the structure shown in FIG. 1. In first step 22.0 the components are picked—two top and bottom plates (in this case top and bottom plates 10 with a single pair of parallel slots); two mortise defining side panels 4 and 5; One pin 3 (here the version with two circlips is chosen); one tenon 6 (here the version with the triangular aperture 66 is chosen) and one vertical slotted plate 1. In step 22.1, the top and bottom plates 10 are slotted into the mortise defining side panels 4 and 5. In step 22.2 the vertical slotted plate 1 is inserted into the assembly from step 22.1 forming the mortise supporting framework 100. In step 22.3 the tenon 6 is inserted into the mortise supporting framework 100 and connected thereto using the pin 3 to form the completed structure 1000. In step 22.4 two structures 1000 are interconnected using the connecting horizontal structural member or beam 300 which is secured to a tenon 6 at each end, in this case by the use of four bolts each end.

FIG. 9 explains how the vertical displacement of one of two interconnected joint comprising structures 1000 with respect to the other, can displace a generally horizontal structural member 300 connected therebetween into a sloped beam allowing the horizontal separation of the two joint comprising structures 1000 to remain substantially constant, while the effective length of the interconnecting beam 300 is increased.

Prior to a seismic event the two joint comprising structures 23.1 and 23.2 are attached to either ends of the connecting beam 300 by joints according to the present invention and are level. During the seismic event the first structure 23.1 is displaced upwards further than the other structure 23.2. In the illustrated example, by 300 mm.

This results in the horizontal interconnecting member or beam 23.3 becoming sloped as its first end is raised with respect to the second. The separation of the two pins of the two joints is thereby extended to 2573 mm form 2555 mm. This is an increase in length of 18 mm. This small increase in height of 300 mm also creates an angle of 6 degrees between the horizontal and the connection beam 300. The horizontal separation of the two joints has remained constant at 2555 mm. The effect of the elongation and the change in the horizontal angle will cause many standard mortise and tenon joints to fail as they are designed to be inflexible.

FIG. 13 depicts the typical construction of a single joint comprising structure, and also depicts the typical construction of a two-joint structure.

FIG. 8/66 depicts a tenon with a triangular aperture. Other embodiments of the tenon may be scaled larger or smaller to suit the requirements of the architectural designer.

FIG. 8/66.1 depicts another tenon with an inverted V-shaped aperture. Other embodiments of this tenon may be scaled larger or smaller to suit the requirements of the architectural designer.

FIG. 8/66.2 depicts a another tenon with an arcuate inverted U-shaped aperture. Other embodiments of this tenon may be scaled larger or smaller to suit the requirements of the architectural designer.

Figure 10:
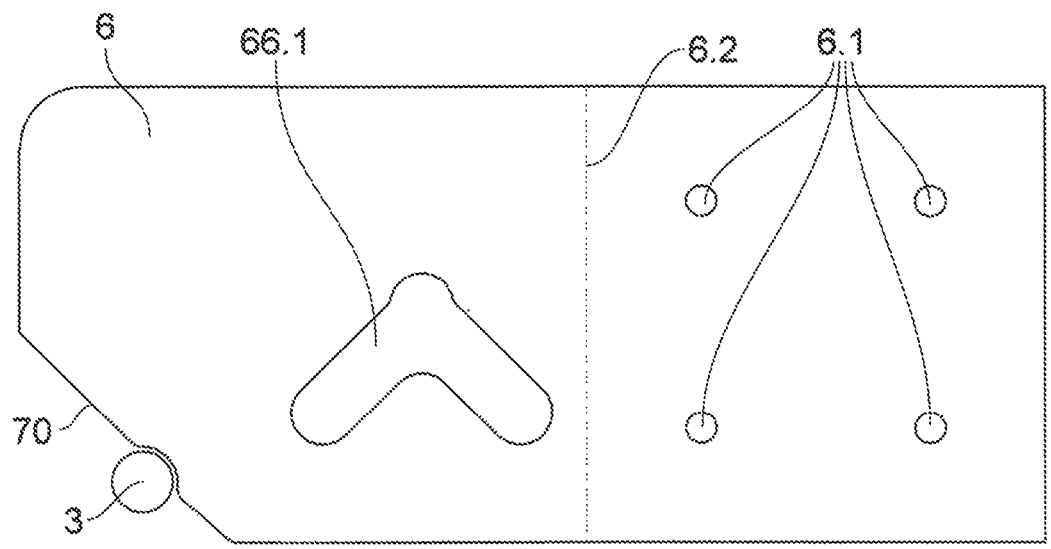
FIG. 10 shows a fourth tenon of a joint depicting both the inverted V slot for the upper pin and the cut-away and notch for the lower stability pin according to the present invention.

FIG. 10 depicts another tenon with an inverted V-shaped aperture and with a further cut-out 70 for receipt of a second pin at the bottom of the mortise defining side plates 4 and 5. This is designed to overcome issues where vertical sway is in excess of requirements. Other embodiments of this tenon may be scaled larger or smaller to suit the requirements of the architectural designer;

The triangular or other shaped aperture 66 comprised by the tenon 6 is an aperture which allows the tenon 6 to locate with the pin 3 firmly at the apex of the triangle for its normal position at rest while allowing the stresses of an earthquake to enable the faces of the triangular aperture 66 to slide along and around the pin 3 for the duration of the earthquake while allowing the weight of the beam assembly (such as the floor or ceiling of the building) to settle the tenon back into its original resting position.

In the illustrated embodiments a minimal tolerance provided between the mortise defining side panels in relation to the thickness of the tenon is a preferred part of the embodiment which resists the turning (moment) of the beam(s) connected to the tenon(s) around their longitudinal axis.

The resistance of the orthogonal elements of the present device ensures the integrity of the building in a vertical plane which requires that the lateral movement be restricted. Where this is inadequate due to local conditions the additional pin and the cut-out 70 as depicted in FIG. 10 may be used. It is envisaged that the tenon connector moves freely within the mortise plate side members.

Beams (300 and 400) between the joints may be manufactured from a variety of materials including but not limited to steel, treated timber; they may be kiln dried beams; green timber beams, engineered timber, engineered I-beams, engineered laminated beams; and/or concrete reinforced beams.

The construction beams may be attached to the connection plate tenon by bolts, glues, welding, or any combination thereof. The method of attachment will be dependent on the stress loadings occasioned by the size and length of the beam and the load imposed on the beam by flooring materials, ceiling materials, furniture, people and the material the beam is made from.

The method for the use of the system comprises the following steps

1—Slotting together of a mortise supporting framework as depicted in FIG. 13. The top and bottom plates are secured in place by means of for timber and engineered timber products—by industrial strength glues and bolts, for steel and iron—by bolts and or welding, for concrete and other similar types of construction material—by industrial strength glues and bolts.

2—Connection of the tenon onto the connecting beam.

3—Foundation elements of the relevant building are assumed to be level. Accurate measuring tools, should be used to ensure the building construction starts level on all floors. Beams should be manufactured to be the correct lengths with a minimal or no tolerance between the design length of the beam and the manufactured length. Protective coatings of the device must be checked to ensure that there are no gaps in coverage and that clearance tolerances of the connector are not reduced by any material value. Vertical pillars should be manufactured exactly to matching heights to ensure the levels of the upper floors are maintained.

4—Insertion of side members into mortise supporting framework 100.

5—Lubrication of the tenon and insertion between the mortise defining side members.

6—Insertion of pin through pin supporting apertures in the mortise defining side members and through the larger aperture 66 in the tenon.

In this way, the device and system of the present invention eliminates the stress on adjoining joints.

FIG. 10 shows a variant tenon 6 and a stabilisation pin 3 for use with a mortise and tenon joint comprises a stabilisation pin 3 in addition to a pin 3 for engaging with the aperture 66.1 formed through the tenon. Both the pin 3 for engaging with the aperture 66.1 and the stabilisation pin 3 extend between opposite side walls 4, 5 of the mortise which receives the tenon. The pin 3 for engaging the aperture 66.1 extends through the aperture 66.1 while the stabilisation pin 3 is external to the tenon 6.

The tenon 6 is generally rectangular with a generally chevron shaped aperture 66.1 formed therethrough. A lower end corner or the generally rectangular tenon is absent to provide a downwards facing sloped edge 70. An indent for receiving the stabilisation pin 3 is formed in the downwards facing sloped edge 70. In use, when the tenon 6 is in a resting position with the pin 3 that extends through the aperture 66.1 being located at the apex of the chevron shaped aperture 66.1 and the tenon 6 is substantially horizontal, the stabilisation pin contacts the edge of the downwards facing sloped edge 70 of the tenon 6 and is received by the indent formed therein. In such an arrangement, the stabilisation pin prevents rotation of the tenon 6 about the pin 3 through its aperture. However, when the tenon is displaced vertically and horizontally such that the pin 3 is displaced out of the apex of the aperture 66.1 the stabilisation pin 3 will be displaced out of the indent and the tenon will be able to rotate about the pin through the aperture.

FIG. 11 depicts a joint according to an alternative embodiment of the invention, wherein apertures 66 are formed through each of the mortise defining side panels 4, 5, instead of through the tenon 6. The pin 3 may be formed integrally with the tenon 6, such that it extends from either side of the tenon 6 into each of the apertures 66, or may be located within a pin supporting aperture 66 (within which the pin may be rotatable, but may not be displaceable) formed through the tenon 6. The illustrated apertures 66 in the mortise defining side panels are downwards pointing triangular shaped, but may alternatively be V-shaped or arcuate U-shaped.

Under the weight of the tenon 6, and/or of a generally horizontal structural member or beam connected thereto, the tenon may come to rest it its lowermost position with the pin at the lowermost points of the apertures 66 in the mortise defining side panels 2.

FIG. 11 shows multiple different mortise defining side panels 2 and sectional view of associated joints. Six of the side panels 36.1, 36.2, 36.3, 36.7, 36.8, 36.9, are for use in the alternative embodiment of the invention and comprise apertures with which the pin 3 engages; which support the pin 3 and thereby support the tenon 6; and within which the pin 3 is displaceable. Two of these six panels 36.1, 36.7 comprise downwards pointing triangular apertures; two of these six panels 36.2, 36.8 comprise V-shaped apertures; and the final two of these six panels 36.3, 36.9 comprise arcuate, generally U-shaped apertures.

Panel 36.6 is a mortise defining side panel 2, 4, 5 for use with a joint according to the first embodiment of the invention, wherein the pin 3 is not able to be moved around within pin supporting aperture formed in the panel as it is smaller than the apertures in panels used for the second embodiment 36.1, 36.2, 36.3, 36.7, 36.8, 36.9.

Four of the panels 36.6, 36.7, 36.8, 36.9 comprise a second aperture 57 proximate to their lower edge, through which an anti-sway pin may be inserted in use. The anti-sway pin passes through the mortise but does not pass through the tenon 6 or any aperture formed therethrough.

Pairs of panels 36.4, 36.5 are mortise defining side panels which may be inserted into some of the pairs of parallel slots in the top and bottom panels in order to form rigid joints which are not according to the invention. The panels 36.4, 36.5 comprising four apertures arranged in a square formation through which bolts may pass in order to secure the end of a beam, or other generally horizontal structural member 300 which is to be rigidly connected to the mortise comprising framework 1000 rather than being connected by a joint according to the present invention. Mortise comprising frameworks 1000 may comprise a combination of flexible joints according to the invention and non-flexible mortises for rigid connecting using panels such as these. The illustrated panels 36.4, 36.5 are for use with standard finished timber, for example with dimensions of 150 mm×44 mm.

Figure 12:
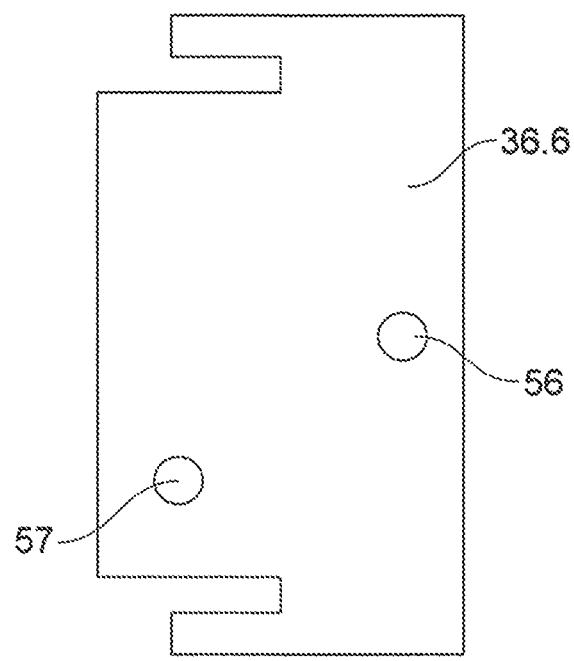
FIG. 12 shows a mortise defining side panel with hole for the upper pin and hole for the stability pm.

FIG. 12 shows a mortise defining side panel 36.6 in more detail.

In some embodiments of the invention it may be envisaged that the present invention provides a retro-fit kit of parts which would position the mortise plate side members and/or mortise supporting frameworks alongside an existing vertical pillar and use tenon connectors connected to existing beams of, for example, for use in a medieval building.

The invention has been described by way of examples only and it will be appreciated that variation may be made to the above-mentioned embodiments without departing from the scope of invention as defined by the claims, in particular but not solely combination of features of described embodiments. For example, the joint may be incorporated into an earth quake resistant structure or components could be supplied with conventional building materials in order provide a rapid deployable building (such as a shed or dwelling) that is able to be fabricated at short notice, for example after an earthquake or similar natural disaster.

The invention claimed is:

1. A joint comprising: a tenon for attachment to a building element; a mortise for receiving the tenon; an aperture having v-shaped edge formed through one of: the tenon and an interior wall of the mortise; and an upper pin which extends from the other of: the tenon and the interior wall of the mortise; wherein the aperture is engaged by the upper pin in use such that the tenon is supported within the mortise on the pin at an apex of said v-shape, and the tenon is capable of rotational, vertical and horizontal motion within the mortise in a plane substantially orthogonal to a longitudinal axis of the pin, the motion being limited by the edges of the aperture and lateral and vertical gaps within the mortise, the joint resetting to its original form following movement owing to gravitational effects on attached building elements.

2. A joint according to claim 1 wherein the aperture is formed through the tenon, the upper pin extends from the interior wall of the mortise and the pin engages the aperture such that the tenon is supported on the pin.

3. A joint according to claim 2 wherein in use, the upper pin extends through the aperture.

4. A joint according to claim 3 wherein the upper pin extends through at least one jaw of the mortise.

5. A joint according to 4 claim wherein the upper pin extends from a first pin retaining aperture formed in an interior wall of the mortise to a second pin retaining aperture in the opposite interior wall of the mortise.

6. A joint according to claim 1 wherein the aperture is formed through the exterior and opposite interior walls of the mortise, the upper pin extends through said apertures and through the tenon held between the mortise panels such that the upper pin is supported within the apertures and the tenon is supported on the upper pin between the mortise panels.

7. A joint according to claim 6 further comprising a lower pin wherein a lower aperture is formed through each of the exterior and opposite interior walls of the mortise, the lower pin extends through said lower apertures and through a second aperture in the tenon held between the mortise panels such that the tenon is supported on the lower pin between the mortise panel(s) and prevented from moving horizontally.

8. A joint according to claim 7 wherein the lower pin engages with said lower aperture such that the tenon is retained within the mortise.

9. A joint according to claim 1 wherein the tenon is displaceable between first, second and third configurations or arrangements in which the upper pin is located at first, second, and third locations respectively, the first, second and third locations being at the vertices of a triangle defined by edges of said aperture in a plane substantially orthogonal to the longitudinal axis of the upper pin.

10. A joint according to claim 1 wherein the entire aperture is triangular or is substantially V-shaped, arc-shaped or chevron shaped.

11. A joint according to claim 1 wherein the upper pin is in the form of a right circular cylinder and is free to rotate within the mortise and or tenon.

12. A joint according to claim 1 wherein the tenon is rounded.

13. A joint according to claim 1 wherein the longitudinal axis of the upper pin is orthogonal to the side faces of the tenon and the side interior walls of the mortise.

14. A joint according to claim 1 further comprising a stabilization pin for limiting motion of the tenon wherein the stabilization pin extends across the mortise and contacts an edge of the tenon when the tenon is in a resting arrangement.

15. A composite joint comprising: first and second joints, according to claim 1, the first and second joints are supported by a pillar or pile and are arranged such that first and second tenons, of respective first and second joints, are substantially perpendicular one to another.

16. A composite joint according to claim 15 wherein the pillar or pile includes horizontal top and bottom plates.

17. A composite joint according to claim 16 wherein the pillar or pile includes at least one T-shaped vertically extending connector having a horizontal top and bottom plate connection.

18. A composite joint according to claim 15 wherein the pillar or pile includes vertical damping means to accommodate vertical movement of the pillar or pile.

19. A composite joint comprising: first, second and third joints, according to claim 1, wherein the first and second joints are supported by a pillar or pile and are arranged such that first and second tenons, of respective first and second joints, are substantially perpendicular one to another and the tenon supported in the third joint is substantially coaxial with the tenon supported in either the first or the second joint.

20. A composite joint comprising first, second, third and fourth joints, according to claim 1, wherein first, second, third and fourth joints are supported by a pillar or pile; and wherein the first and third joints are substantially perpendicular to the second and fourth joints.

* * * * *